US009613352B1

(12) United States Patent
Leoutsarakos (10) Patent No.: US 9,613,352 B1
(45) Date of Patent: *Apr. 4, 2017

(54) CARD-LESS PAYMENTS AND FINANCIAL TRANSACTIONS

(71) Applicant: Nicolas Leoutsarakos, Montreal (CA)

(72) Inventor: Nicolas Leoutsarakos, Montreal (CA)

(*) Notice: Subject to any disclaimer, the term of this patent is extended or adjusted under 35 U.S.C. 154(b) by 84 days.

This patent is subject to a terminal disclaimer.

(21) Appl. No.: 14/583,093

(22) Filed: Dec. 24, 2014

Related U.S. Application Data (63) Continuation-in-part of application No. 14/050,323, filed on Oct. 9, 2013, now abandoned, and a
(Continued)

(51) Int. Cl.

| | | |
|---|---|---|
| *G06F 11/30* | (2006.01) | |
| *G06F 12/14* | (2006.01) | |
| *G06Q 20/34* | (2012.01) | |
| *G06Q 20/40* | (2012.01) | |
| *G06Q 20/32* | (2012.01) | |
| *H04W 12/08* | (2009.01) | |

(52) U.S. Cl.
CPC ....... *G06Q 20/352* (2013.01); *G06Q 20/3226* (2013.01); *G06Q 20/4014* (2013.01); *H04W 12/08* (2013.01)

(58) Field of Classification Search
CPC ............. G06F 21/10; G06F 2221/2107; G11B 20/00086; H04L 9/08
USPC ............... 713/155–167, 189–193; 380/8–30, 380/44–47, 277–286; 709/229
See application file for complete search history.

(56) References Cited

U.S. PATENT DOCUMENTS

| | | |
|---|---|---|
| 4,885,778 A | 12/1989 | Weiss |
| 5,657,470 A | 8/1997 | Fisherman et al. |
| (Continued) | | |

FOREIGN PATENT DOCUMENTS

| | | |
|---|---|---|
| JP | 2006-033780 | 2/2006 |
| WO | WO 2010/133353 | 11/2010 |

OTHER PUBLICATIONS

EMC2 Webpage, RSA SecureID, www.emc.com/security/index.htm, printed Sep. 2012.
(Continued)

*Primary Examiner* — Evans Desrosiers
(74) *Attorney, Agent, or Firm* — Law Office of Dorian Cartwright; Dorian Cartwright (57) ABSTRACT

Payments and financial transactions are made without a physical card (and without a password). Payment information of a payer is functionally handicapped while stored in a payment user profile on a hosting payment processor server. When a payment request from a payee is received by the payment processor server, a QR-code or other machine readable information is generated for display by a payee device. Once the QR-code is scanned by the payer device, a human gesture is requested in order to unlock the payment information stored in the payment user profile. The correct human gesture reconstitutes the key (or security data) stored on the payer device, and then transmits the key to the payment processor server for reconstituting another key used to enable payment information to be used to execute the payment.

9 Claims, 11 Drawing Sheets

Related U.S. Application Data continuation-in-part of application No. 13/607,769, filed on Sep. 9, 2012, now Pat. No. 8,954,758.

(60) Provisional application No. 61/711,738, filed on Oct. 9, 2012, provisional application No. 61/578,224, filed on Dec. 20, 2011.

(56) References Cited

U.S. PATENT DOCUMENTS

| | | | |
|---|---|---|---|
| 6,915,435 | B1 | 7/2005 | Merriam |
| 7,302,571 | B2 | 11/2007 | Noble et al. |
| 7,337,331 | B2 | 2/2008 | Yoshida |
| 7,404,085 | B2 | 7/2008 | Lacasse et al. |
| 7,565,297 | B2 | 7/2009 | Labaton |
| 7,761,704 | B2 | 7/2010 | Ho et al. |
| 7,783,900 | B2 | 8/2010 | Hacigumus et al. |
| 7,826,619 | B2 | 11/2010 | Hanaoka |
| 7,836,515 | B1 | 11/2010 | Woodward |
| 7,849,314 | B2 | 12/2010 | Kao et al. |
| 7,895,437 | B2 | 2/2011 | Ganesan et al. |
| 7,907,838 | B2 | 3/2011 | Nasiri et al. |
| 7,921,450 | B1 | 4/2011 | Vainstein et al. |
| 9,058,603 | B1 * | 6/2015 | Lee ............... G06Q 20/3829 |
| 2003/0061503 | A1 | 3/2003 | Katz |
| 2004/0030917 | A1 | 2/2004 | Karamchedu et al. |
| 2008/0015995 | A1 | 1/2008 | Chen |
| 2008/0059787 | A1 | 3/2008 | Hohenberger et al. |
| 2008/0065894 | A1 | 3/2008 | Wang et al. |
| 2008/0301775 | A1 | 12/2008 | Ollikainen et al. |
| 2009/0196417 | A1 | 8/2009 | Beaver et al. |
| 2009/0327745 | A1 | 12/2009 | Dang et al. |
| 2010/0050244 | A1 | 2/2010 | Tarkhanyan et al. |
| 2010/0107219 | A1 | 4/2010 | Thompson et al. |
| 2011/0099379 | A1 | 4/2011 | Ganesan et al. |
| 2011/0112968 | A1 | 5/2011 | Florek |
| 2011/0191244 | A1 * | 8/2011 | Dai ....................... G06F 21/64 705/44 |
| 2011/0246766 | A1 | 10/2011 | Orsini et al. |
| 2012/0274550 | A1 | 11/2012 | Campbell et al. |
| 2013/0159732 | A1 | 6/2013 | Leoutsarakos |
| 2013/0185815 | A1 | 7/2013 | Leotsarakos |

OTHER PUBLICATIONS

VASCO Data Security Webpage, www.vasco.com/startpage.aspx, printed Sep. 2012.

AES Website Homepage, FIPS, http://csrc.nist.gov/archive/aes/index1.html, printed Sep. 2012.

Rivest, R.L. et al., "A method for obtaining Digital Signatures and Public Key Cryptosystems." Communications of the ACM. Feb. 1978 21(2) pp. 120-126.

Blakley, G.R., Safeguarding Cryptographic Keys, 1979, Proceedings of the National Computer Conference 48: 313-317.

Shamir, Adi, "How to Share a Secret", Programming Techiniques, Communications of the ACM, vol. 22 (11), 612-613, Nov. 1979, doi: 10.1145/359168.359176.

Noar, Moni et al., Visual Cryptography, 14 pages, in Eurocrypt, 1994 Proceedings.

Herzberg, Amir, Introduction to Cryptography Subject 6: Resiliency to Corruptions and key Exposures, Jan. 11, 2004, Computer Science Department, Bar Ilan University, 69 pages.

Bellare et al., Protecting against Key Exposure: Strongly Key-Insulated Encryption with Optimal Threshold, Department of Computer Science & Engineering, University of California San Diego, Jun. 26, 2002, San Diego, US.

Golle et al., Universal Re-encryption for Mixnets, Topics in Cryptology—CT-RSA 2004, Lecture Notes in Computer Science, 2004, vol. 2964/2004, 1988, Abstract.

* cited by examiner

CARD-LESS PAYMENTS AND FINANCIAL TRANSACTIONS

CROSS-REFERENCES TO RELATED APPLICATIONS

This application claims priority under 35 USC 119(e) to U.S. patent application Ser. No. 14/050,323, filed Oct. 9, 2013, entitled CARD-LESS PAYMENTS AND FINANCIAL TRANSACTIONS, by Leoutsarakos, which in turn claims priority to 61/711,738, filed Oct. 9, 2012, entitled CARD-LESS PAYMENTS AND FINANCIAL TRANSACTIONS, by Leoutsarakos; and also claims priority under 35 USC 120 to U.S. patent application Ser. No. 13/607,769, filed Sep. 9, 2012, entitled PASSWORD-LESS SECURITY AND PROTECTION OF ONLINE DIGITAL ASSETS, by Leoutsarakos, which in turn claims priority to U.S. Patent Application No. 61/578,224, filed Dec. 20, 2011, entitled SYSTEM AND METHODS FOR PASSWORD-LESS USER AUTHENTICATION, ACCESS CONTROL AND TRANSACTION TRACKING, by Leoutsarakos, the contents of each of the above-mentioned applications being hereby incorporated by reference.

FIELD OF THE INVENTION

The invention relates generally to online security, and more specifically, to making payments and executing financial transactions without a physical card (and without a password).

BACKGROUND

Currently, financial transactions are consummated by a physical means, such as currency, credit or debit cards, checks, and the like. The card-based transactions can be handled by an automated clearinghouse (ACH) processor such as First Data. For example, a customer pays with a credit card or debit card for a purchase. The card data, merchant data, and available funds are all verified and a confirmation is provided to consummate the transaction.

However, there are numerous drawbacks to the conventional process, including card and identity theft, inconvenience, equipment availability, reliability and security, and high backend costs of clearinghouses and card companies. Consumers also have the burden of remembering a PIN number for debit cards.

What is needed is a robust technique to make payments and financial transactions without a physical card (and without a password), while overcoming the deficiencies of the prior art.

SUMMARY

To meet the above-described needs, methods, computer program products, and systems for making payments and financial transactions without a physical card (and without a password).

In one embodiment, payment information for a payer is stored in a payment user profile on a payer device or a hosting payment processor server. The payment user profile is functionally handicapped with a human gesture and/or by removing at least a portion of digital data (either a conceptual 'key', or a cryptographic key) associated with the payment user profile and discarding the key after being sent to another device, rendering the payment user profile substantially useless.

When a payment request from a payee is received by the payment processor server, a QR-code or other machine-readable information is generated for display by a payee device or invoice. Once the QR-code is scanned by the payer device, a human gesture is requested in order to unlock the payment information stored in the payment user profile. The correct human gesture reconstitutes the key (or security data) for transmission to the payment processor server for reconstituting another key (or security data) used to enable the payment user profile. Accordingly, temporary exposure of payment information is utilized to consummate a transaction.

Advantageously, payments can be made without a physical card and without a password.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for making payments and financial transactions without a card (and without a password).

Generally, an asset owner protects access to payment options in a payment user profile by functionally handicapping the digital asset and hiding the key (either a conceptual 'key' or a cryptographic key) for enablement. A payment user profile, as used herein, refers to a digital asset associated with a user for accessing certain data of a secure website (e.g., personal banking information, or a streaming movie account). Functionally handicapping the payment user profile refers to making the payment user profile partially or completely unusable in traditional forms by removing parts of the data, encrypting, removing file formatting information, adjunct files, or source code, and the like (using, for example, a SODA engine). Distributing the key for enablement refers to splitting key and sending parts of the key to payer devices. In one case, users scan a QR-code from a display screen of a website with a cell phone, and provide a gesture to the phone for authentication. In response, payment user profiles are temporarily enabled to allow access to payment information for completing a payment. Numerous alternatives are described herein. Also, embodiments of SODA technology are described in more detail in U.S. patent application Ser. No. 13/607,769, entitled PASSWORD-LESS SECURITY AND PROTECTION OF ONLINE DIGITAL ASSETS, by Leoutsarakos which is hereby incorporated by reference.

One of ordinary skill in the art will recognize that the following disclosure can be applied to many different embodiments beyond the specific examples illustrated herein. For example, the techniques can apply to transactions other monetary ones.

Figure 1A:
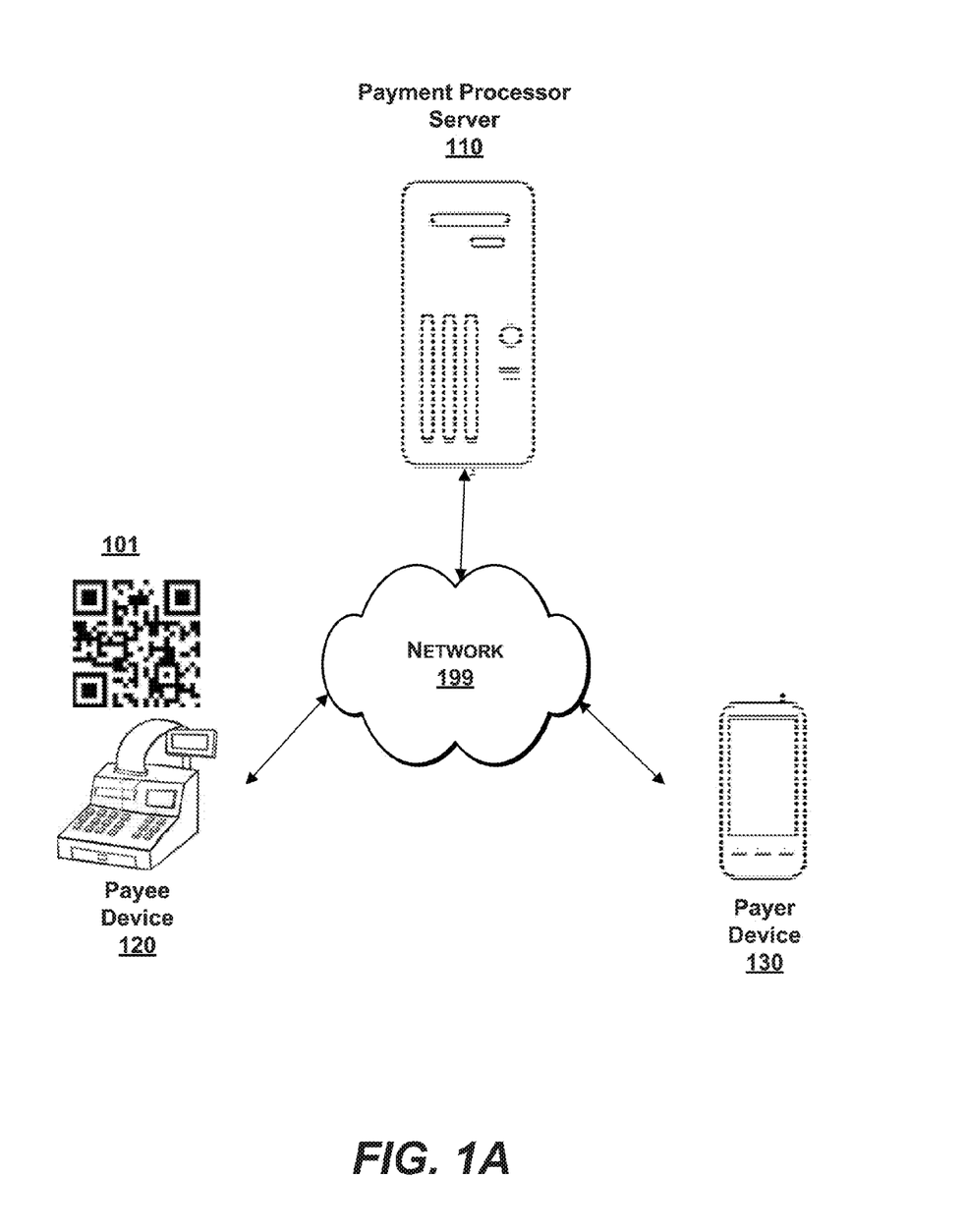
FIG. 1A is a high-level block diagram illustrating a system to make payments and financial transactions without a physical card, according to one embodiment.
Figure 1B:
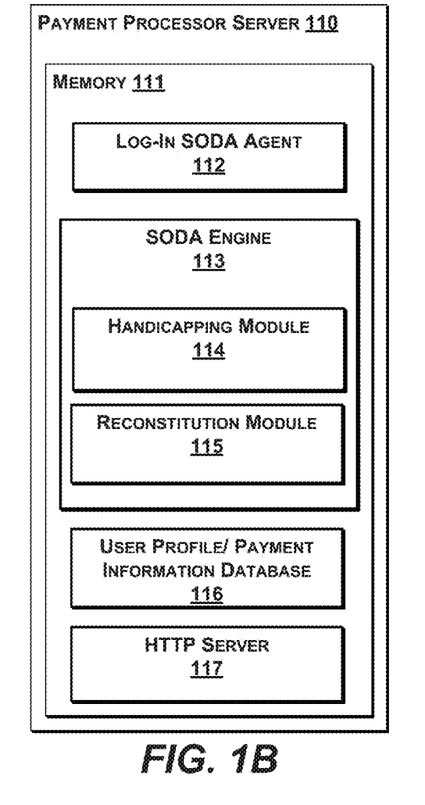
FIG. 1B is a more detailed block diagram illustrating a payment processor server of FIG. 1A, according to one embodiment.
Figure 1C:
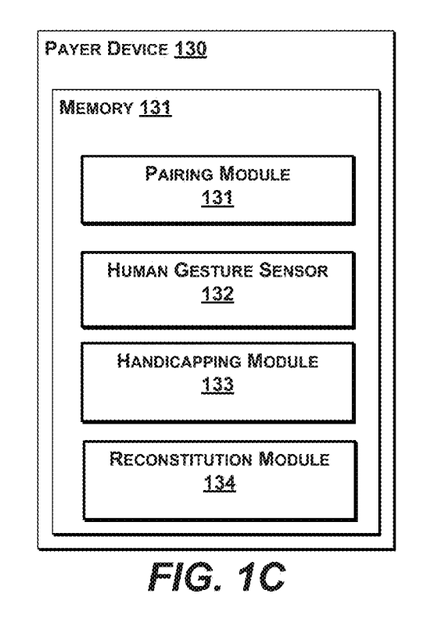
FIG. 1C is a more detailed block diagram illustrating a payer device of FIG. 1A, according to one embodiment.

Card-Less Payment Systems (FIGS. 1A-C)

FIG. 1A is a high-level block diagram illustrating a system 100 to make payments and financial transactions without a physical card, according to one embodiment. The system 100 comprises a payment processor server 110, a payee device 120, and a payer device 130, each in communication with a network 199. At a high-level, a user payer device 130 can satisfy bills at the intermediary payment processor server 110 by scanning a QR-code at the payee device 120, and providing a gesture, without presenting a physical card during the transaction.

In one embodiment, the payment processor server 110 coordinates payment transactions between a payee device 120 and a payer device 130. To do so, the payment processor server 110 stores payment user profiles in a functionally disabled state by removing a security data associated with the file (either directly from the file, or indirectly related such as a cryptographic key). The removed security data is sent to the payer device, payer device 130, and discarded so that reconstitution of the payment user profile without removed digital data on the payment processor server 110 is substantially impossible. Reconstitution is possible when the payer device, payer device 130, returns the security data to enable (e.g., temporarily) the payment user profile. Once reconstituted, payment information can be accessed to satisfy payment with the payee device 120, before returning the payment user profile to a functionally disabled state.

Figure 7:
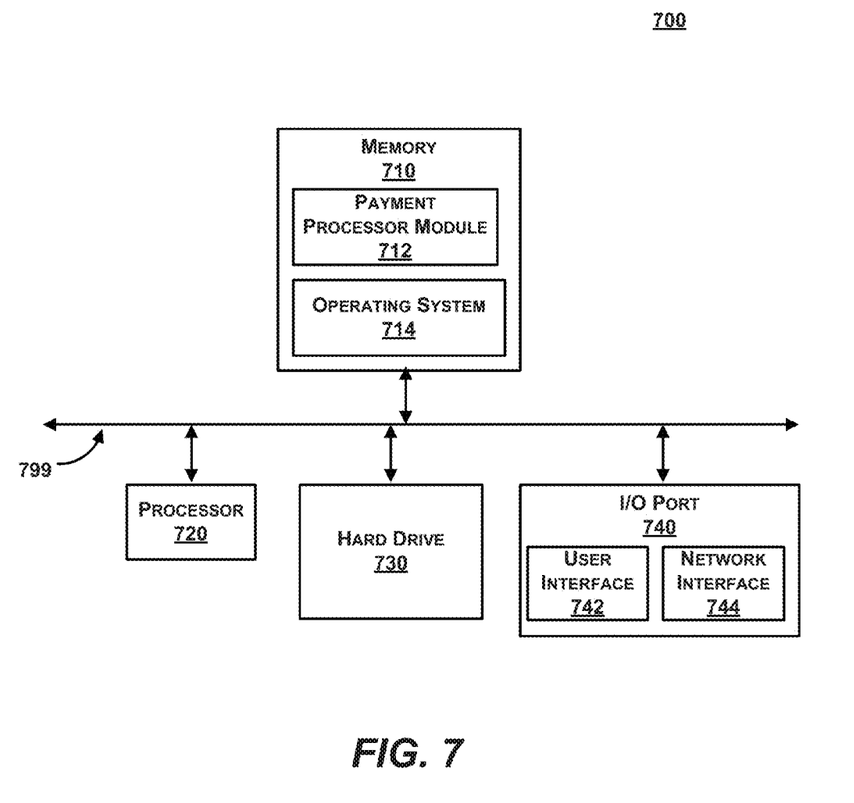
FIG. 7 is a block diagram illustrating an exemplary computing device, according to one embodiment.

Generally, the payment processor server 110 can be a computer, a set of distributed computers, a server, a virtual server, any passive device that is activated with a host processor, such as a memory device (e.g., a flash drive), or any processor-based device, as described further in FIG. 7. The payment processor server 110 can be continually connected online, or can connect to the network 199 for the purpose of authorization of access requests. The payment processor server 110 can be operated by a data storage service, a data center, a mobile telephone company providing service for the payer device 130, and the like. Embodiments of the payment processor server 110 are discussed in more detail below in association with FIG. 1B.

The payee device 120 requests payment through the payment processor server 110, and displays the responsive QR code 101 for the payer device 130 to scan in satisfying payment. In more detail, the payee device 120 is also initially registered with the payment processor 110 to create a payment user profile with payment receiving information (can also add payment sending information). A payer ID can be established, along with channels for receiving payment, such as ACH information, bank account or PayPal information, for example. When a payment is requested, for instance after scanning items at a cash register totaling a certain amount, the QR-code 101 for that particular transaction is requested from the payment processor 110. A payment user profile of the payee device 120 can optionally be functionally disabled and enabled as described below in association with a payment user profile of the payer. Once payment is satisfied, the funds are automatically sent on the backend from the payer to the payee.

The payee device 120 can be any computing device, fixed or mobile, disclosed herein, such as in FIG. 7, a POS device, an ATM machine, a cash register, any machine requiring a log-in, an automobile user interface, a smartphone or tablet and the like. Some implementations can modify a conventional payee device by installing a downloaded client or mobile application. The user 140 attempting to access a payment user profile through the user terminal 120 is presented with machine readable code through a display. The machine readable code can be, for example, a QR-code, a UPC label, a bar code, or any other suitable encoded information.

The payer device 130 scans a QR-code to identify a payment request, and functionally enables a payment user profile at a payment processor server with payment information used to satisfy the payment, before the payment user profile is returned to a functionally disable state. From a security standpoint of the system 100, the payer device 130 provides an interface between the user 140 and the secure payment processor server 110 for authentication. In operation, the payer device 130 is paired with a payment user profile of a user at the secure payment processor server. The payer device 130, in an embodiment, can further handicap and store a security data that functionally handicaps the payment user profile of the payment processor server 110. In order to make a payment, the payer device 130 can enable a payment user profile by first reconstructing and providing the security data it holds in store. Additionally, human gestures or other types of authentication can be received and processed (e.g., converted to data) by the payer device 130 to reconstruct a security data and then send it to the payment processor server 110 for executing a payment or financial transaction.

The payer device 130 is preferably a mobile device that is convenient to a user, such as, a smart cellular telephone, or a tablet computer, as described further in FIG. 7. The payer device 120 can also be a laptop, a stationary or desktop computer, or the like. Some implementations can modify a conventional payer device by installing a downloaded client or mobile application. The application can allow payments to be made, as well as payments to be received on the system 100. Embodiments of the payer device 130 are discussed in more detail below in association with FIG. 1C.

Payers can be individuals that create, control, or utilize payment information in a payment user profile. The user can be a sole owner of a payment user profile, or could be a co-owner in a horizontal or vertical co-ownership scheme as described below. The payment user profile can vary depending on the payment processor server. The payment user profile is created at enrollment. For example, a payment user profile can include personal financial information, accounts numbers, registration for an event, social networking friends and status updates, and the like. The payment user profile can also include non-personal information, such as a copy of a digital book available to subscribers, access to cloud-based software, a copy of a cell phone application, and the like. In some embodiments, the user provides to his payer device a bio-sample (e.g. fingerprint) that is translated to data used to form a key to decrypt a locally stored key (or security data)

on the payer device 130, which is then sent to the payment processor server or site 110 to reconstitute the payment user profile and allow the requested access and execution of financial transaction.

The network 199 provides a data communication channel between the payment processor server 110, the payee device 120 and the payer device 130. The network 199 can be, for example, the Internet, a data cellular network, or a data local network. The data communication channel can be through any suitable wired (e.g., Ethernet) or wireless (e.g., Wi-Fi or 4G) medium, or combination. Other embodiments of communication channels are possible, including hybrid networks. In one embodiment, the payee device 120 communicates with the payment processor server 110 using a cellular network while the payer device 130 does so using a Wi-Fi network. Additional network components not shown in FIG. 1A can also be part of the system 100, such as firewalls, virus scanners, routers, switches, application servers, databases, and the like.

FIG. 1B is a more detailed block diagram illustrating the payment processor server 110, according to one embodiment. The payment processor server 110 includes a memory 111 with a log-in SODA agent 112, a SODA engine 113, a payment user profile/payment information database 116 and an HTTP server 117. The components are shown in the memory 111 which, in one embodiment, can be a RAM-type memory for execution. The components can also be stored for long-term in a volatile memory, be streaming applications stored in the cloud and downloaded as needed.

The login SODA agent 112 integrates the protection and security into a website. More specifically, the log-in SODA agent 112 leverages functionality of the SODA engine 113 to disable and enable payment user profiles, as described herein. The log-in SODA agent 112 can output machine readable information or other indications to the HTTP server 117 for display to the user 140 attempting a log-in. Further, the log-in SODA agent 112 can interact with the payer device 130 to enable payment user profiles which are stored in disabled state.

The SODA engine 113 in some embodiments is agnostic to a particular implementation (e.g., log-in versus POS payments or file protection). But in other embodiments, the SODA engine 113 is optimized for a particular implementation (e.g., parameters set for high security application or minimal security application). The SODA engine 113 further comprise a handicapping module 114 to handicap payment user profiles and a reconstitution module 115 to enable payment user profiles, as discussed below.

The payment user profile/payment information database 116 stores payment user profiles along with means for satisfying payments for one or more users. In some embodiments, the payment user profile/payment information database 116 includes an Active Directory or similar platform. The payment user profile/payment information database 116 can be stored locally in a single memory element or over a network with a protocol-based file system (e.g., a storage area network, or SAN, a network attached storage, or NAS, or the like).

The HTTP server 117 can be an Apache server or any suitable component to serve webpages to a user, and perform login services to private data. The HTTP server 117 sends a login webpage for display, and once logged-in, presents private data as a webpage for display. The webpages can be composed in HTML, Java, Flash, or the like.

FIG. 1C is a more detailed block diagram illustrating the payer device 120, according to one embodiment. The payer device 120 includes a memory 115 with a pairing module 131, a human gesture sensor 132, a handicapping module 133, and a reconstitution module 134. An optional secret-splitting module can also be included.

The pairing module 131 sets up a user with the system 100 and enrolls the payer device 130. The human gesture sensor 132 receives and processes gestures or other input using a touch screen, a speaker, a camera, a gyroscope, or other type of sensor. The handicapping module 133 handicaps a security data associated with a payment user profile at the payment processor server 110 with data from a human gesture provided by the payer. The reconstitution module 134 restores the security data associated with a payment user profile at the payment processor server 110 from the human gesture received for approval of a payment.

Card-Less Payment Methods (FIGS. 2-6B)

Figure 2:
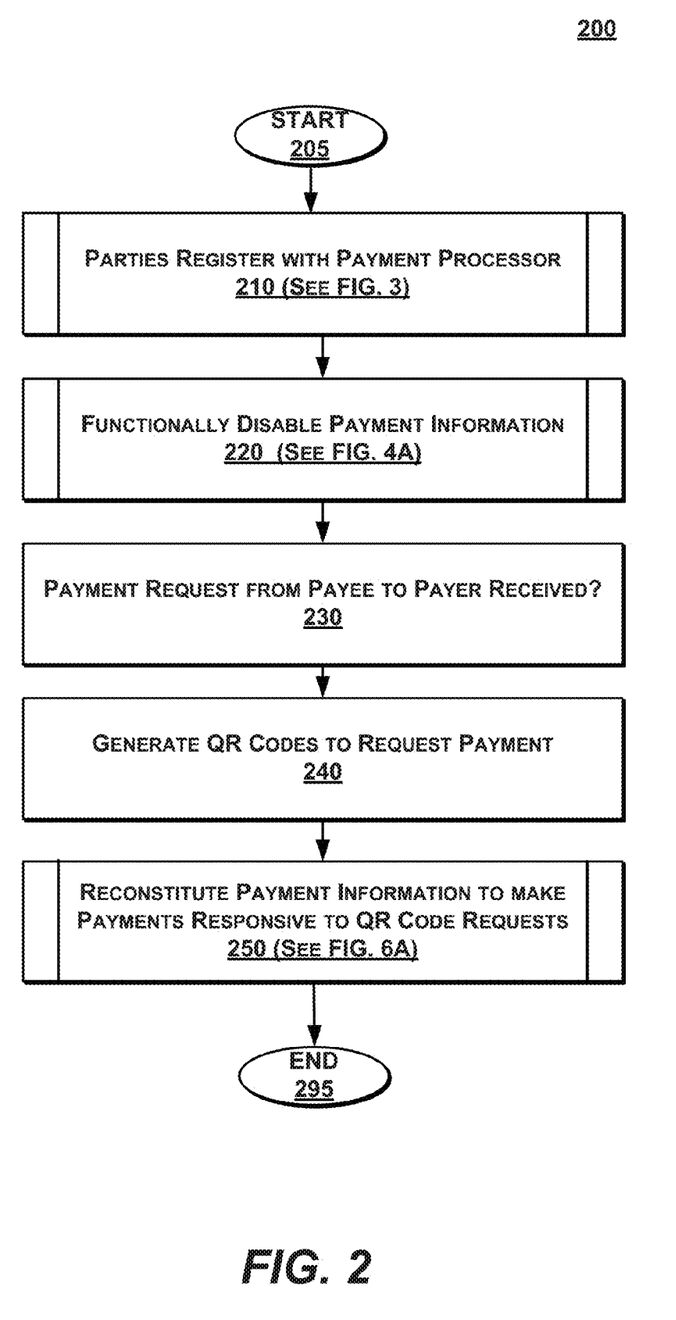
FIG. 2 is a high-level flow diagram illustrating a method for making payments and financial transactions without a physical card, according to one embodiment.

FIG. 2 is a high-level flow diagram illustrating a method 200 for making payments and financial transactions without a physical card, according to one embodiment. The method 200 can be implemented, in one embodiment, using the system 100 of FIG. 1A. Moreover, the method 200 can be implemented in software, hardware, or a combination of both. The method 200 can be automatically performed (once initialized) without human intervention.

At step 210, parties register with a payment processor. A payer device is paired with a payment user profile. The payment user profile is created using information received from a user through a smart phone or a desktop computer. A user may need to enter payment information such as credit card numbers, expiry dates, bank account numbers and other private payment data on a payer device. To configure a smart cellular telephone, for instance, for use as a payer device, a QR (quick response) Code or other indicia is generated by a payment processor server and scanned by the cell telephone. An example of pairing is described in FIG. 3. In some embodiments, the payment user profile is created at the payment processor, and in some embodiments, is created at the payer device to further reduce exposure risks. A payer device may turn into a payee device and vice versa, at will.

At step 220, a payment user profile with the payment information is protected without a password by functional disablement. Functional disablement can occur on the payer device before being sent to a server, or by the server itself. Advantageously, vulnerabilities are eliminated because there is no comparison step of the prior art password-based security. Rather than using a password, a portion of data is removed, or encrypted with data from a human gesture, in order to handicap the payment user profile. The data portion, or human gesture, thereby serves as a key to restoring the payment user profile. In some embodiments, the key can be generated when handicapping the payment user profile with encryption. The digital asset can be individually secured, be part of a group of files secured by a single key, or file system references to the payment user profile can be secured. By comparison to the prior art, a compromised password exposes the unlimited potential of a digital asset in full. On the other hand, by use of the technique disclosed herein, the security data is destroyed within a server after being sent to a payer or payee device. Security data is also destroyed on the payer or payee device so that reconstitution data is incomplete without a human gesture. Therefore, there is no data to be compromised using the techniques described herein. In some embodiments, more than one authentication is required to restore a payment user profile (e.g., modify a file or run an application). In other embodiments, a secret splitting technique is used to hide a key to a payment user profile. A more detailed discussion of how to implement step 220 is set forth below in association with FIGS. 4A-B and 5A-B.

In response to a payment request from payee to payer received at step 230, at step 240 a QR-code is generated by a payment processor server to request a payment. The QR-code includes information about the payee and an invoice number at the least, but can also include information about purchases, amounts, and acceptable payment types. Some information stored with the payment request can cause an immediate display on the payer device. The QR-code can be displayed on a screen of the payee device, printed on an invoice or ticket, displayed on a television screen broadcast, or the like.

At step 250, a payment user profile is reconstituted to make payments responsive to QR-code payment request, without using a password. An access to the payment user profile can include a log-in to view non-public data or take advantage of permissions specific to the user. To access payment user profiles, the security data extracted in step 220 is reconstituted and used to enable payment user profiles for normal use. Payment user profiles are again disabled after users log-off. In other embodiments, more than one authentication is required to restore a digital asset (e.g., secret splitting). Each access can be logged. In some embodiments, a human gesture leads to creation of a secure data that is sent to a payment processor for functionally enabling the payment user profile (either alone or in combination with other security data). More details are set provided below in connection with FIG. 6A.

Figure 3:
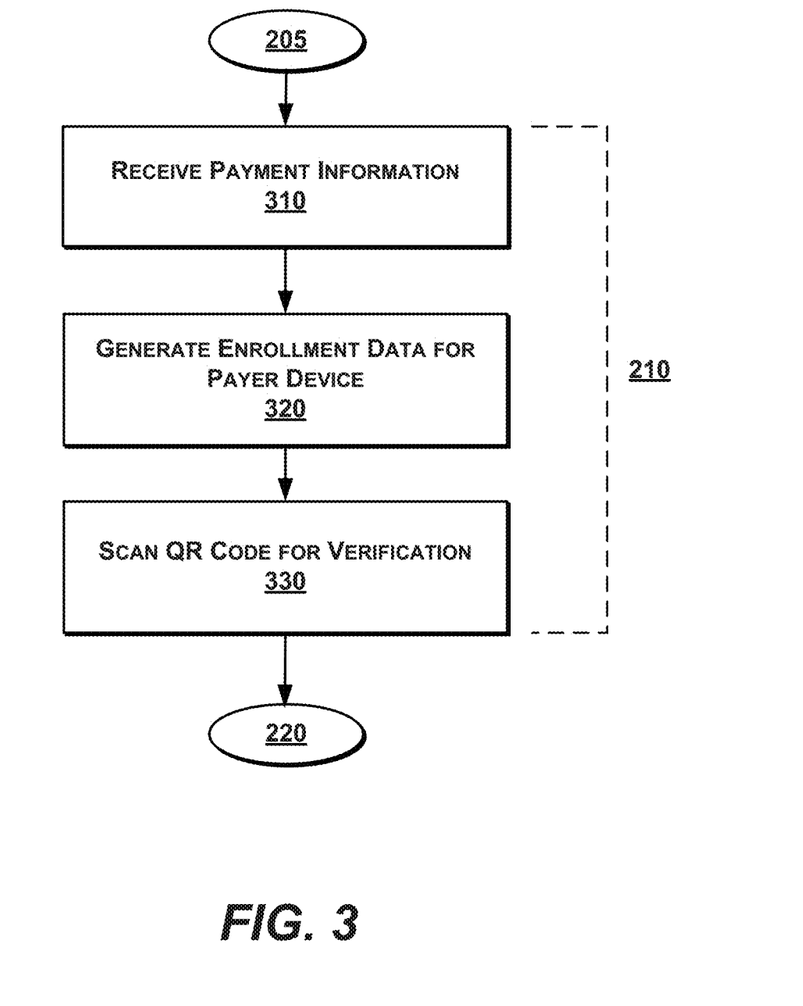
FIG. 3 is a flow diagram illustrating a method of FIG. 2 for pairing a payer device with a payment user profile, according to one embodiment.

FIG. 3 is a flow diagram illustrating a method 210 of FIG. 2 for pairing a payer device with a payment user profile, according to one embodiment. Given the disclosure herein, one of ordinary skill in the art will recognize that numerous alternatives are available for pairing, other than the following example.

At step 310, a payment user profile with payment information is generated at a payment processor server. A user name, e-mail, address, payment information, account numbers, desired services, preferences, friends list, contact list, multimedia files, data files, passwords, or other information can be associated with the use profile. In an embodiment, information in payment user profile, such as the payment information and account numbers may have been previously disabled by payer or payee device, and then sent to the payment processor server. The payment user profile links a particular individual to the private data stored on a server.

At step 320, enrollment data is generated for a payer device used to access a payment user profile. In one embodiment, a QR-code can be generated for display on a computer screen.

At step 330, the payer device can scan the QR code to receive encoded information needed for enrollment of the payer device. In other embodiments, enrollment data can be sent directly to the payer device using a data network. As a result, a secure communication (e.g. SSL, or secure socket layer) is created between the payment processor server and the payer device.

Figure 4A:
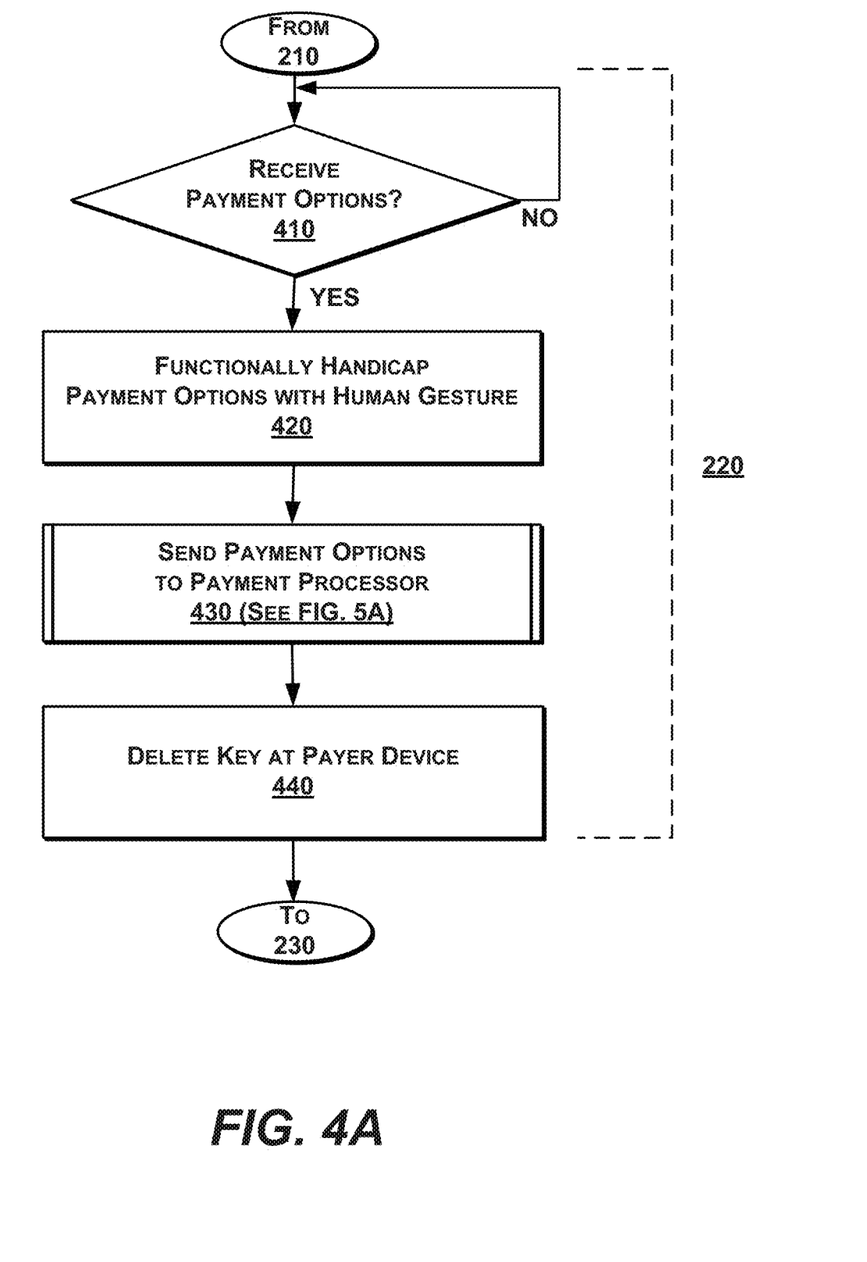
FIGS. 4A-B illustrates a step for protecting payment options in a payment user profile by functional disablement without a password of FIG. 2, according to some embodiments.
Figure 4B:
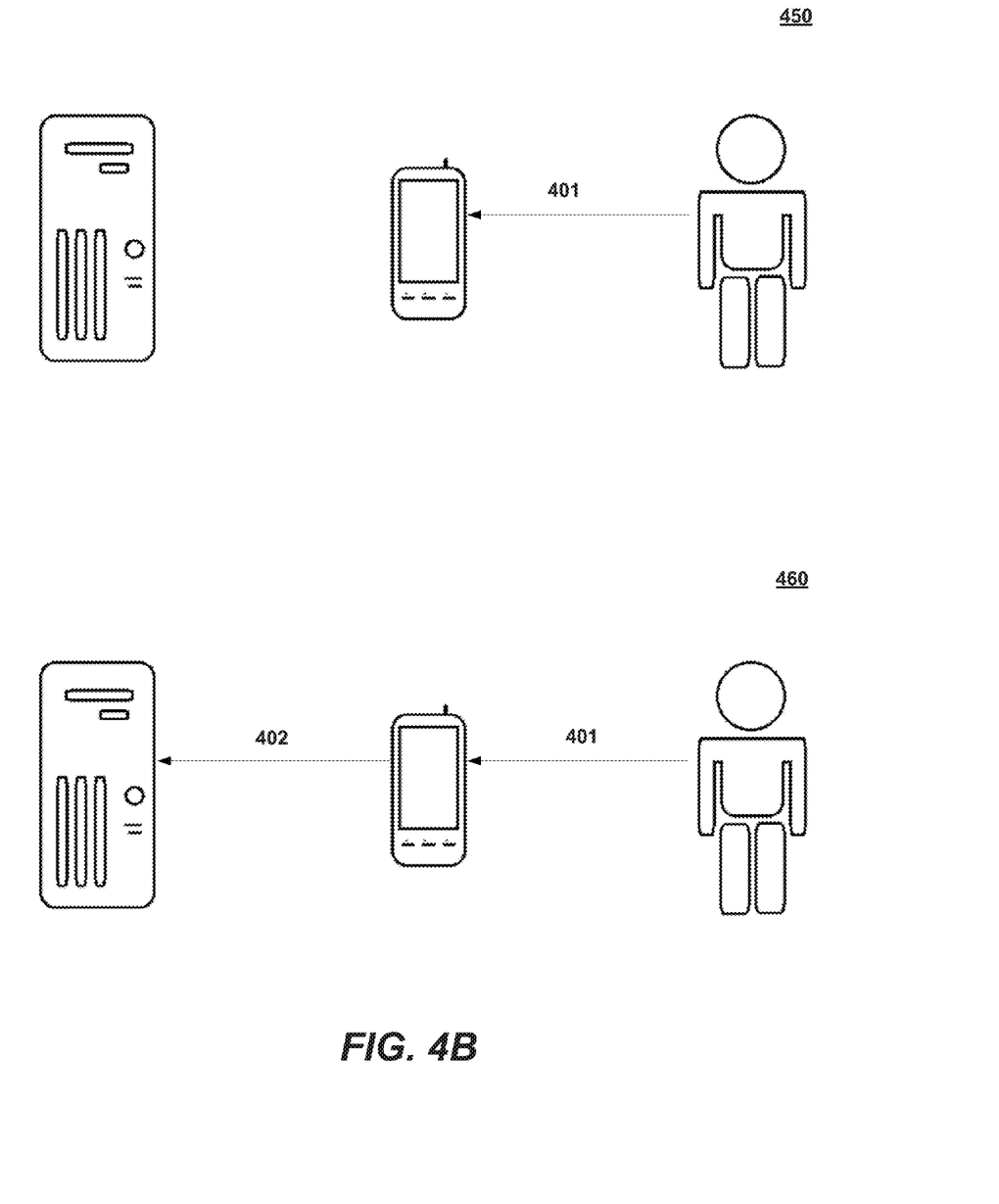

FIG. 4A is a flow diagram and FIG. 4B is a schematic diagram illustrating step 220 of FIG. 2 for protecting a payment user profile with payment information without a password, according to one embodiment. At step 410, the process awaits receipt of a payment user profile (e.g., as newly configured, updated, or after log-off by a user). Once a payment user profile is received for storage in a payee device or a payment processor server, it needs to be disabled.

At step 420 (e.g., interaction 401 of FIG. 4B), the payment user profile is functionally handicapped at the payee device with a human gesture. The disabled payment user profile can be further handicapped by removing a portion of the data so that decryption alone will not restore the payment user profile. The portion can be part of the payment user profile itself, or peripheral data. In one embodiment, the digital asset is encrypted with a symmetric or asymmetric key, and the key or a portion of the key is removed. In another embodiment, bits of data are removed from the digital asset itself. For example, a sensitive part of a document can be targeted for removal so that even if the document is somehow restored, the sensitive parts of the document are not present. The removal can also be randomly-located. Fake bits can be substituted for removed bits to hide location. The number of bits removed should exceed correction capabilities by CRC (cyclic redundancy check) and the like, and the number of bits can be based on a type of digital asset or security level. In still another example, configuration data needed to view or execute a digital asset are removed (e.g., DLL, or dynamic linked library, files). For example, a Word or .DOC file includes a metadata portion that is needed to decode the data file. In some implementations, data assets on a payment processor server appear as a list of files with unknown file types by removing file formatting data. Consequentially, a hacker looking for a certain type of file will be set back even further. In yet another embodiment, hardware operation is handicapped by substantially altering its firmware. The hardware, which can be an automobile, a garage door opener, a computer terminal, or any other protected physical device, is rendered inoperable until authorized.

At step 430 (e.g., interaction 402 of FIG. 4B) the once or twice disabled payment user profile is sent from the payer device to the payment processing server. In some embodiments, the security data can be sent to multiple devices, as discussed below with respect to FIGS. 5A-B. A payment user profile can be checked to find a payer device of the asset owner.

At step 440, parts of the key that were sent to other devices are deleted at the payer device. Or if disabled by the payment processor server, once the security data is confirmed as being received by the payer device, the security data is securely erased from volatile or permanent memory on the payment processor server. The data can be merely disassociated with any file system entry, or securely removed to prevent recovery. By removing the security data, there is no local key for decrypting, or otherwise reconstituting the payment user profile in case the payment processor server is compromised. Further, there is no link to the payer device, leaving no trace of how to find the enabling data portion.

In some embodiments the key (or asset security data) is only partially removed from a server. In more detail, a secret splitting algorithm can be utilized to generate a derivative key stored on the server away from the payment user profile. As a result, any access of the digital asset can be logged by the server, even if a copy is stored locally on a remote storage device. The secret splitting algorithm generates unique derivative keys for the payer device or devices. One way to generate derivative keys is to randomly select data points along a polynomial graph. Each unique data point is potentially a unique derivative key.

Besides a human gesture, any other type of human-input data can be used, such as a voice pattern, a retina pattern, fingerprint, or facial scan. Data from a human gesture is securely discarded from the payer device as soon as a key (or asset data portion) is disabled or reconstituted. In some implementations, data from a human gesture can be stored and automatically supplied in lieu of availability of the payment user profile owner. The human gesture can be stored separately from a payer device and automatically provided, for example, in low security environments such as access to view movies. If the payment user profile owner loses confidence in the automatic process, it can be easily terminated or updated with a new human gesture.

Figure 5A:
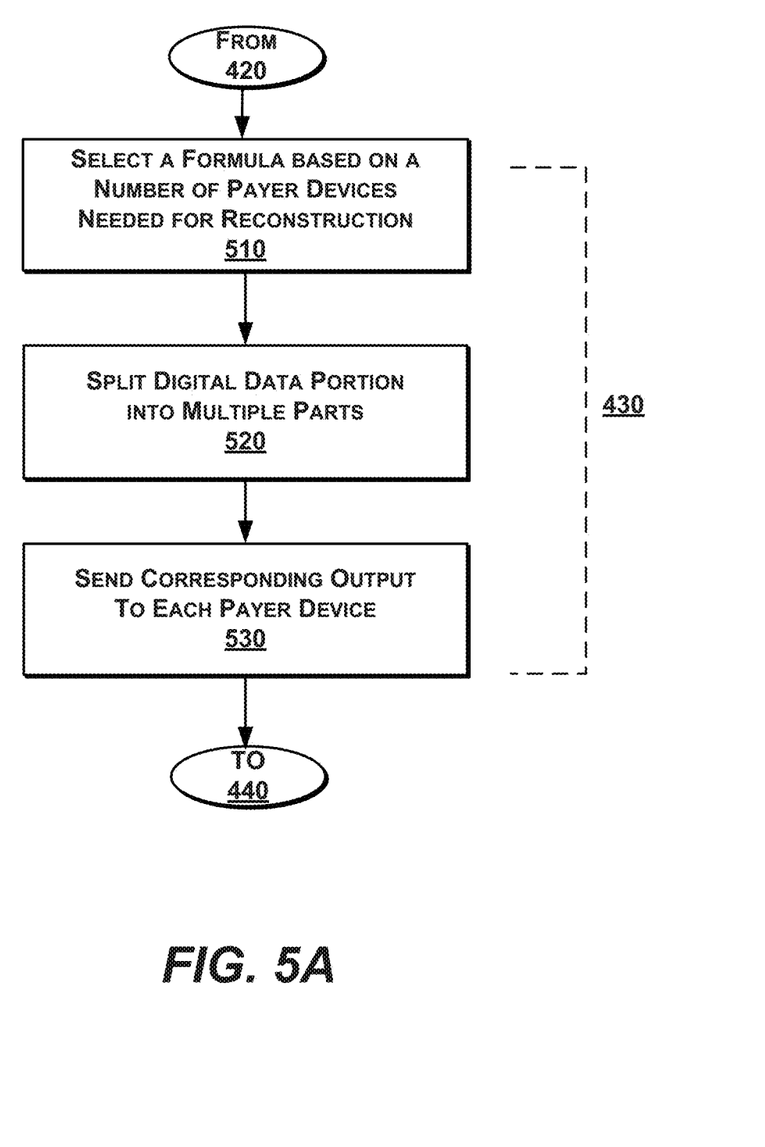
FIGS. 5A-B illustrate a step for sending sub-portions of security data to multiple payer devices using a secret-splitting algorithm of FIG. 4A, according to some embodiments.
Figure 5B:
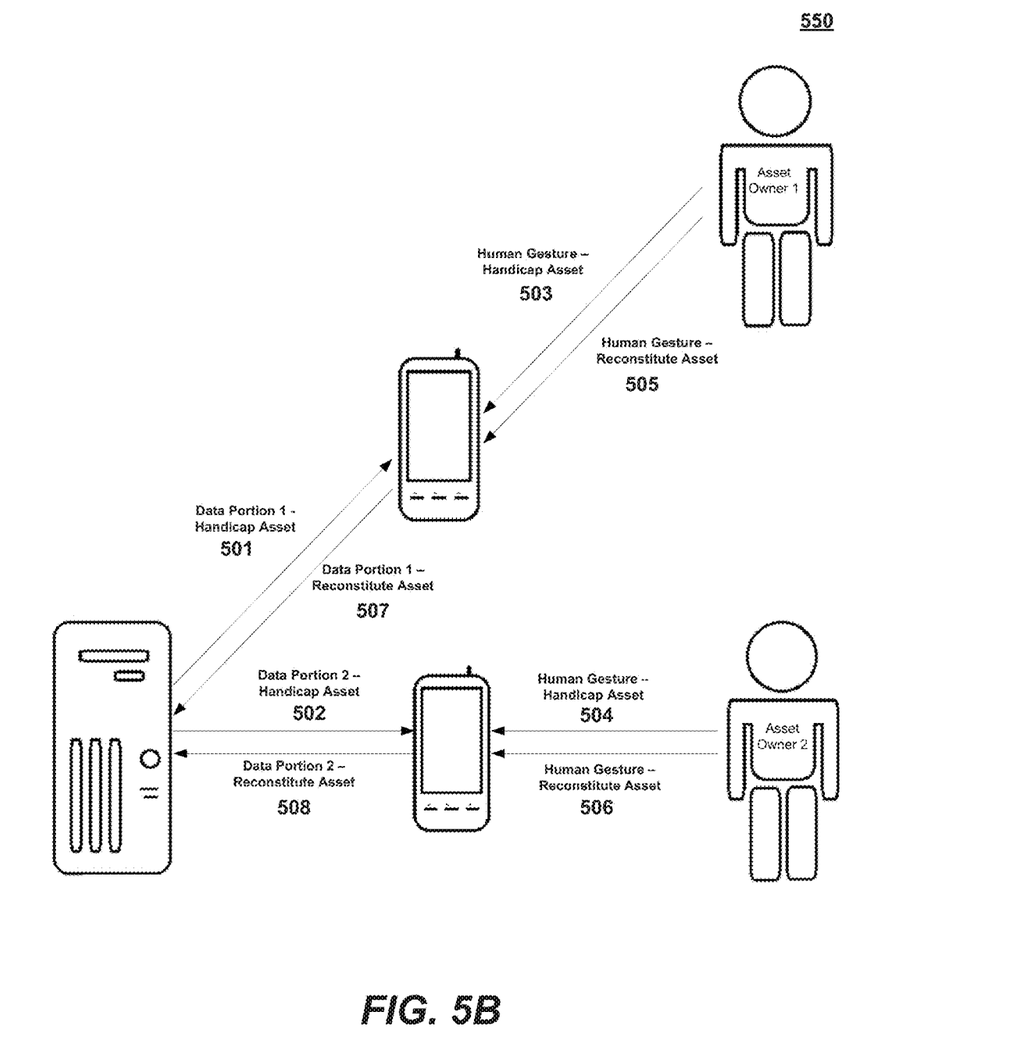

FIG. 5A is a flow diagram and FIG. 5B is a schematic diagram illustrating a method 430 of FIG. 3 for sending sub-portions (or derivatives) of a security data to multiple payer devices using a secret splitting algorithm, according to some embodiments. For example, a Shamir polynomial decomposition and re-composition algorithm can be employed to divide a secret into unique parts and give each payer device a unique part of the secret. In a threshold scheme of secret sharing, any threshold number of payer devices can trigger re-composition, rather than needing all payer devices. For example, any two management employees can be required to access certain financial data.

In some embodiments, the payment user profile security data is distributed among the payment processor server and multiple payer devices. In a horizontal architecture of multiple payer devices, a digital asset portion is split among the payer devices from a server. Each of these payer devices may also be needed for reconstitution. But in some embodiments, only a threshold number of payer devices is needed for reconstitution. The threshold number is less than the total number of payer devices. For instance, any three of ten payer devices can be required for reconstitution. In a vertical architecture of multiple payer devices, a payment user profile portion is sent to a first payer device, where it is split and the split portion sent to a second payer device. The second payer device can again split received data, and so on. As discussed, although FIGS. 5A and B discusses splitting as originating from the payment processing server, splitting can be initiated and performed by the payee or payer device as well.

At step 510, a formula is selected based on a number of payer devices that are needed for reconstruction. The coefficients of the polynomial are set based on input received. For example, a jointly-owned project may require each of the payer devices for reconstructions, while an employee-only project may require at least one of many employees. The same formula is used for decomposition.

At step 520, a security data is split into multiple parts. The parts can have some overlap, be mutually exclusive, or some parts can be duplicates. Most importantly, all of the information needed to reconstitute a payment user profile is not available on a server. Consequentially, payment user profiles with payment information stored on a compromised payment processor server are still protected. As discussed, the splitting can be performed at a payer device and split parts passed to other payer devices in a hierarchy.

A secret splitting algorithm can be utilized to generate multiple keys. In more detail, a key is used as a constant in a polynomial equation. Any number of keys can be generated as data points on the polynomial graph. The specific form of the equation depends on how many unique keys are being distributed. For a line (e.g., $ax+y$), only two data points are needed as input to solve for reconstitution. For a parabola (e.g., $ax^2+bx+y$, etc.), at least three data points are needed as input to solve for reconstitution. An example polynomial can be $SSS+87x+34)^2$, where SSS is a constant representing a cryptographic key or data portion used for handicapping the payment user profile. To generate a point on the graph to be used as a derivative key stored at a server or sent to an payer device, a random value within a valid range of x is input to the polynomial and a y value is output. The resulting x,y data point is the derivative key, in some embodiments. To reconstitute the discarded polynomial, a requisite number of x,y data points are provided (e.g., from the server and at least one payer device), as described herein.

In one embodiment, a Shamir secret splitting algorithm is implemented. To derive a polynomial, Shamir uses the well-known Lagrange polynomial interpolation formula. Alternative secret splitting algorithms can also be implemented, such as the Mignotte scheme (using Chinese remainder Theorem) or the Blakely scheme.

At step 530 (interactions 501, 502), one of the parts is sent to each of the payer devices. Rather than sending the parts to a single payer device, the parts are distributed to more than one end point. Each payer device encrypts the parts with a human gesture (interactions 503, 504). Additionally, one of the parts can be stored on a server, apart from the digital asset. All other data is destroyed at the server for security, in some embodiments, including the polynomial used to generate keys, and keys sent to an payer device. The key is effectively hidden at the payer device, away from any hacker, by getting rid of the key altogether. Even if the payer device is compromised, part of the key has been hidden by the human gesture, as described herein.

A horizontal co-ownership is illustrated in FIG. 5B. Two types of horizontal co-ownership include equal co-ownership and distributed co-ownership. In equal co-ownership, a separate polynomial is used to generate keys for each co-owner. There is no dependency as each co-owner can access the payment user profile without an accord. Meanwhile, in a distributed co-ownership, a single polynomial is used to generate keys for each co-owner. The dependency in this case to access to the digital asset requires keys from each or a subset of co-owners.

The return path is also illustrated in FIG. 5B, in which upon notification of an access request, human gestures are received (interactions 505, 506) in order to release the parts back to the payment processor server (interactions 507, 508).

Figure 6A:
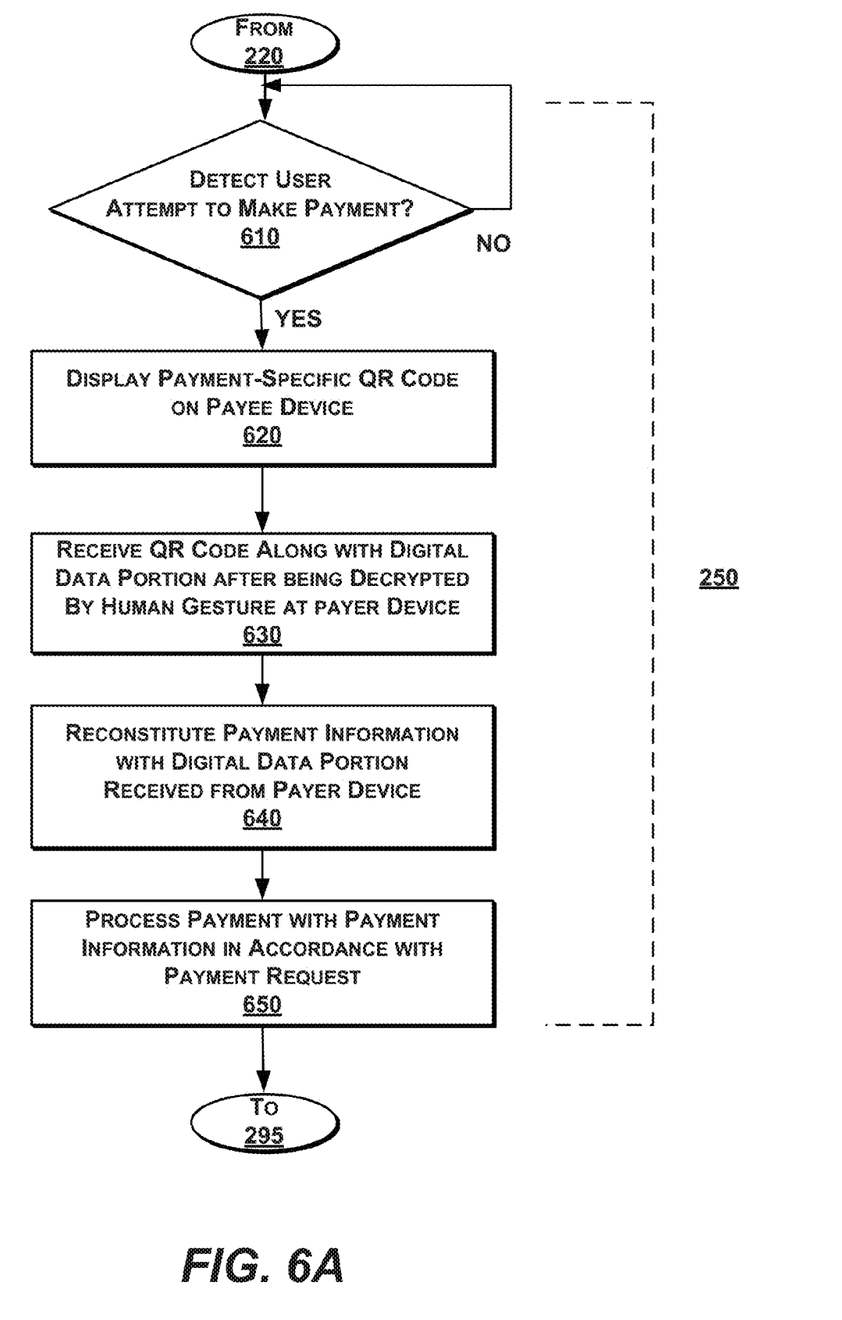
FIGS. 6A-B illustrates a step for reconstituting payment information in a payment user profile without a password of FIG. 2, according to some embodiments.
Figure 6B:
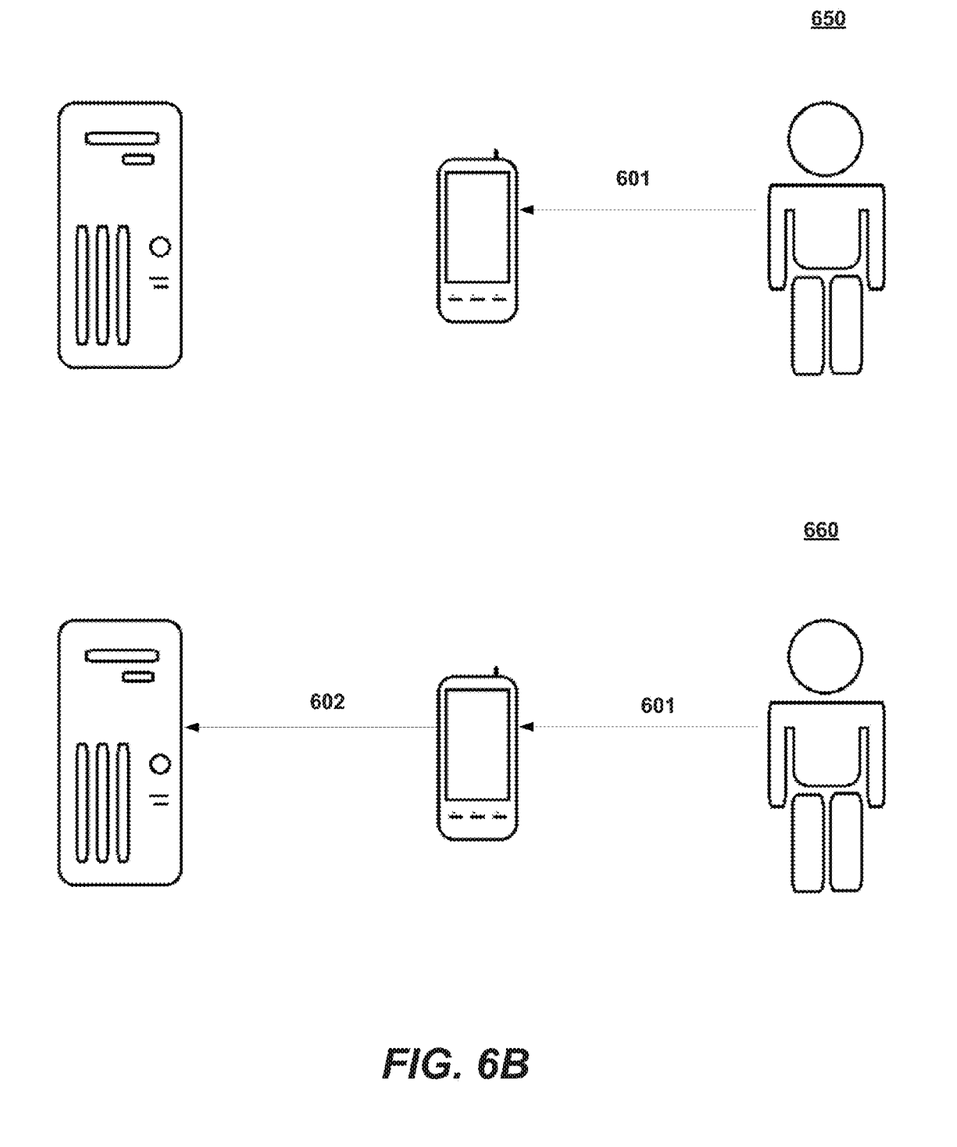

FIG. 6A is a flow diagram and FIG. 6B is a schematic diagram illustrating step 230 of FIG. 2 for accessing a payment user profile without a password, according to some embodiments. Specifically, FIG. 6A is a flow diagram illustrating step 230 of FIG. 2 for accessing a payment user profile without a password.

At step 610, the process awaits receipt of a request to access a payment user profile. The request can be received from a payment user profile owner, or a non-owner, and from a human or an automated computer process.

At step 620, a payment-specific QR-code is displayed on, for example, a payee device or invoice. The QR-code identifies the web page being accessed. A URL or other identifier can be encoded into the QR-code. In one embodiment, the QR-code is unique to a specific log-in session, or unique to a particular user or payer device.

At step 630, the scanned QR-code is received along with a data portion (interaction 602) after being reconstituted by a human gesture (interaction 601). The gesture can be a two-dimensional or three-dimensional movement of the hand or other body parts. In some embodiments, other forms of input can be implemented, such as a retina scan or fingerprint. Data from the human gesture forms a key that is used to decrypt the security data for transmission.

At step 640, a payment user profile is reconstituted using the security data received from the payer device. In one embodiment the security data received from the payer device is used as a key to decrypt the payment user profile for use as requested.

At step 650, a payment is processed with the payment user profile in accordance with a payment request. After being temporarily exposed, the payment user profile is again disabled and all enabling information is deleted. In one embodiment, payment processing occurs in an isolated security environment, such as on a hardware security processor or in a virtual Java machine, to prevent exposure to other processes.

Optionally, access to the payment user profile is logged, in one embodiment. Because all the steps to access a digital asset are e-signed by the participants (systems or humans), the log may be admissible to court as an identification and authentication of the person accessing the payment user profile. Additionally, license restrictions can be enforced by recording quantities and durations of access.

Exemplary Computing Device (FIG. 7)

FIG. 7 is a block diagram illustrating an exemplary computing device 700 for use in the system 100 of FIG. 1, according to one embodiment. The computing device 600 is an exemplary device that is implementable for each of the components of the system 100, including the user terminal 110, the secure web site server 120, and the payer device 120. Additionally, the system 100 is merely an example implementation itself, since the system 100 can also be fully or partially implemented with laptop computers, tablet computers, smart cell phones, Internet appliances, and the like.

The computing device 700, of the present embodiment, includes a memory 710, a processor 720, a hard drive 730, and an I/O port 740. Each of the components is coupled for electronic communication via a bus 799. Communication can be digital and/or analog, and use any suitable protocol.

The memory 710 further comprises a digital asset protection module and an operating system 722. The digital asset protection module 712 can include the modules of the payment processor server 110 and the payer device 120, as represented generally by a digital asset protection module 712. Other modules stored in memory can include a web browser application, a web-browser-based application, a mobile application, a streamed application, a locally-installed application, and the like.

The operating system 722 can be one of the Microsoft Windows® family of operating systems (e.g., Windows 2000, Windows XP, Windows XP x64 Edition, Windows Vista, Widows 7, Windows 8, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Atheros, Broadcom, and Marvell Semiconductors manufacture processors that are optimized for IEEE 802.11 devices. The processor 720 can be single core, multiple core, or include more than one processing elements. The processor 620 can be disposed on silicon or any other suitable material. The processor 720 can receive and execute instructions and data stored in the memory 710 or the storage drive 730

The storage drive 730 can be any non-volatile type of storage such as a magnetic disc, EEPROM, Flash, or the like. The storage drive 730 stores code and data for applications.

The I/O port 740 further comprises a user interface 642 and a network interface 744. The user interface 642 can output to a display device and receive input from, for example, a keyboard. The network interface 744 connects to a medium such as Ethernet or Wi-Fi for data input and output.

Many of the functionalities described herein can be implemented with computer software, computer hardware, computer firmware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Bluetooth, LTE, Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in a payment processor server on a network for making payment without a physical card, comprising:

responsive to receiving a payment request from the payee device, generating machine-readable information that is unique for the payment request;

receiving a scan of the machine-readable information, from a payer device, to identify the payment request corresponding to the payee device;

matching the payer device to payment information, wherein the payment information has been functionally handicapped to prevent normal use, wherein handicapping the digital asset comprises removing a portion of bits from the digital asset itself to prevent normal use of the digital asset;

receiving a security data from the payer device that has read the machine-readable information, the security data being reconstituted by the payer device using at least a human gesture as input;

reconstituting the payment information using the security data to functionally enable the payment information for normal use;

satisfying the payment request of the payee from the payment information of the payer; and returning the payment information to being functionally handicapped to prevent normal use.

2. The method of claim 1, wherein the payment information was initially functionally handicapped by the payer device prior to being initially sent to the payment processor server.

3. The method of claim 1, wherein the payee device is associated with a cash register or backend or online POS (point of sale) server.

4. The method of claim 1, wherein the method is performed in real-time during a transaction.

5. The method of claim 1, wherein the QR-code is displayed by the payee device or is printed out on a payee invoice.

6. The method of claim 1, wherein the payment information comprises at least one of: a debit card information, a credit card information, ACH information, Chase QuickPay information, PayPal information, e-check information, and bank account information.

7. The method of claim 1, wherein the payer device includes an application allowing payments to be made or to be received, utilizing the payment processing server.

8. A non-transitory computer-readable medium storing instructions that, when executed by a processor, perform a method for making a payment in a payment processor on a network without a physical card, the method comprising the step of:

responsive to receiving a payment request from the payee device, generating machine-readable information that is unique for the payment request, for display at the payee device;

receiving a scan of the machine-readable information, from a payer device, to identify the payment request corresponding to the payee device;

matching the payer device to payment information, wherein the payment information has been functionally handicapped to prevent normal use, wherein handicapping the digital asset comprises removing a portion of bits from the digital asset itself to prevent normal use of the digital asset;

receiving a security data from the payer device that has read the machine-readable information, the security data being reconstituted by the payer device using a human gesture as input;

reconstituting the payment information using the security data to functionally enable the payment information for normal use;

satisfying the payment request of the payee from the payment information of the payer; and returning the payment information to being functionally handicapped to prevent normal use.

9. A payment processor on a network to make payment without a physical card, comprising:

a processor; and a memory, comprising:

a first module to, responsive to receiving a payment request from the payee device, generate machine-readable information that is unique for the payment request, for display at the payee device;

a second module to receive a scan of the machine-readable information, from a payer device, to identify the payment request corresponding to the payee device;

a third module to match the payer device to payment information, wherein the payment information has been functionally handicapped to prevent normal use, wherein handicapping the digital asset comprises removing a portion of bits from the digital asset itself to prevent normal use of the digital asset;

a fourth module to receive a security data from the payer device that has read the machine-readable information, the security data being reconstituted by the payer device using a human gesture as input;

a fifth module to reconstitute the payment information using the security data to functionally enable the payment information for normal use;

a sixth module to satisfy the payment request of the payee from the payment information of the payer; and a seventh module to return the payment information to being functionally handicapped to prevent normal use.

* * * * *